Patented June 23, 1931　　　　　　　　　　　　　　　1,811,149

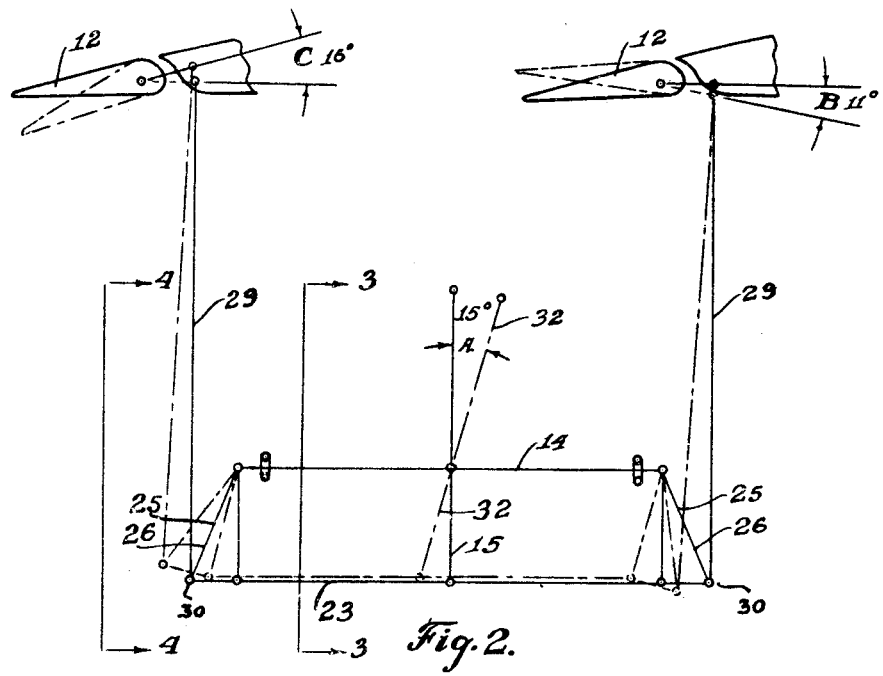
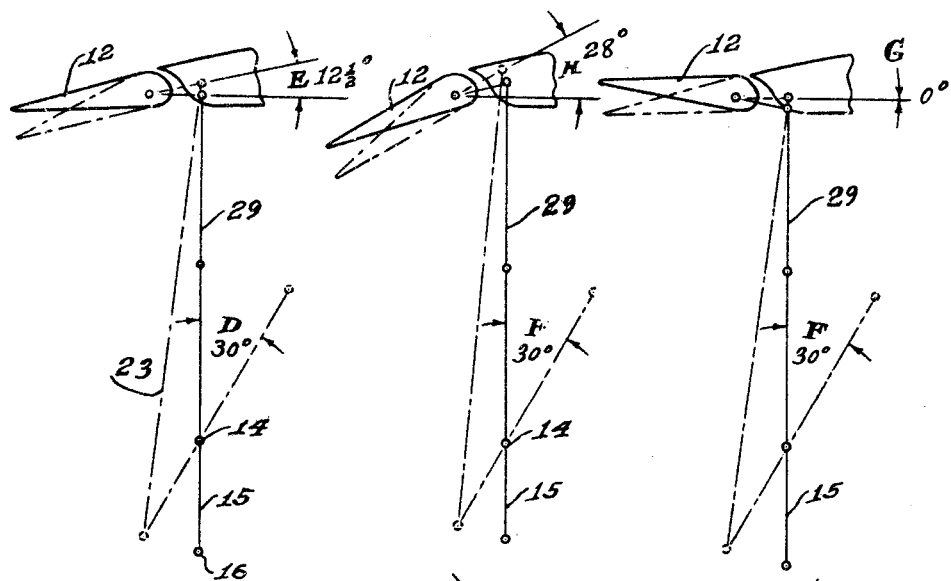
Fig. 2.
Fig. 3.
Fig. 4.

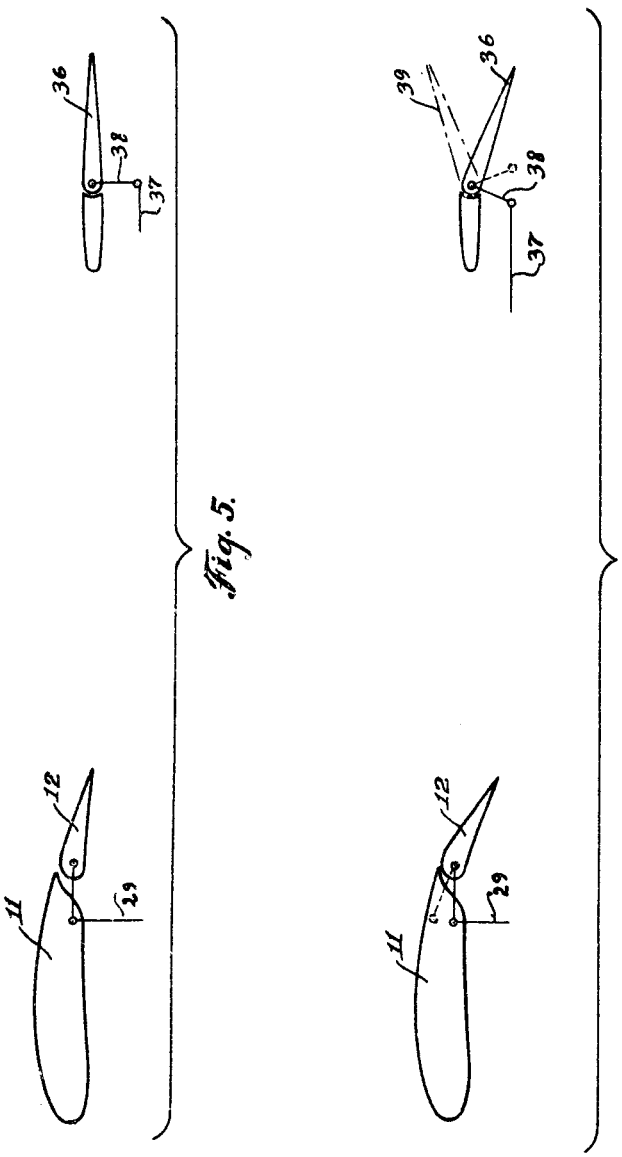

UNITED STATES PATENT OFFICE

ARTHUR G. PETERSEN, OF BROOKLYN, NEW YORK

STEERING CONTROL FOR AEROPLANES

Application filed January 25, 1930. Serial No. 423,287.

This invention relates to new and useful improvements in a steering control for aeroplanes, and may suitably be applied to any kind of standard construction.

The invention has for an object the provision of a device of the class mentioned, which is of simple durable construction, dependable in use and efficient in action, and which can be manufactured and sold at a reasonable cost.

The invention proposes in combination with an aeroplane having a right and left wing or wings, an elevator and the customary rudder, each wing provided with an aileron movable to change its profile of the wings on the pressure side, a shaft mounted for movements about its axis, a stick pivotally supported on said shaft so as to move in planes longitudinal with said axis, means for moving the free end of the stick in all directions, and means for transmitting forward and rearward movements of the stick into up and down movements of said elevator and into downward movements of said right and left ailerons to the pressure side only, and sideward movement of the stick in one direction into a simultaneous upward movement of the right aileron and downward movement of the left and sideward movement in the other direction into a simultaneous downward movement of the right aileron and upward movement of the left and combination movements of the stick forward or rearwards and sidewards into combination movements of the said ailerons and elevator.

Throughout this specification the term "ailerons" is used to define the parts themselves as seen on the drawings and not the action of the parts. The parts as illustrated on the drawings may go through an "aileron movement" or through a "flap movement". The distinction is that in the event of an aileron movement one moves upward while the other moves downwards. A flap movement consists in both moving downwards so as to increase the lifting capacity, and also to increase the head-on resistance for reducing the speed of the plane especially during landing, and likewise in facilitating a quick take-off. The aileron movement accomplishes turning.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:—

Figure 2 is a fragmentary schematic front elevational view of the steering control shown connected with the ailerons, which are 90 degrees from their true positions.

Figure 3 is a fragmentary sectional view as though looking along the lines 3—3 of Figure 2, but showing the aileron in its true relation to the steering control.

Figure 4 is a view looking in the direction of the line 4—4 of Figure 2, showing the ailerons in their true position.

Figure 5 is a schematic side elevational view of the aeroplane wing and elevator, and Figure 6 is a view similar to Figure 5, but showing the parts in a different position.

Figure 1:
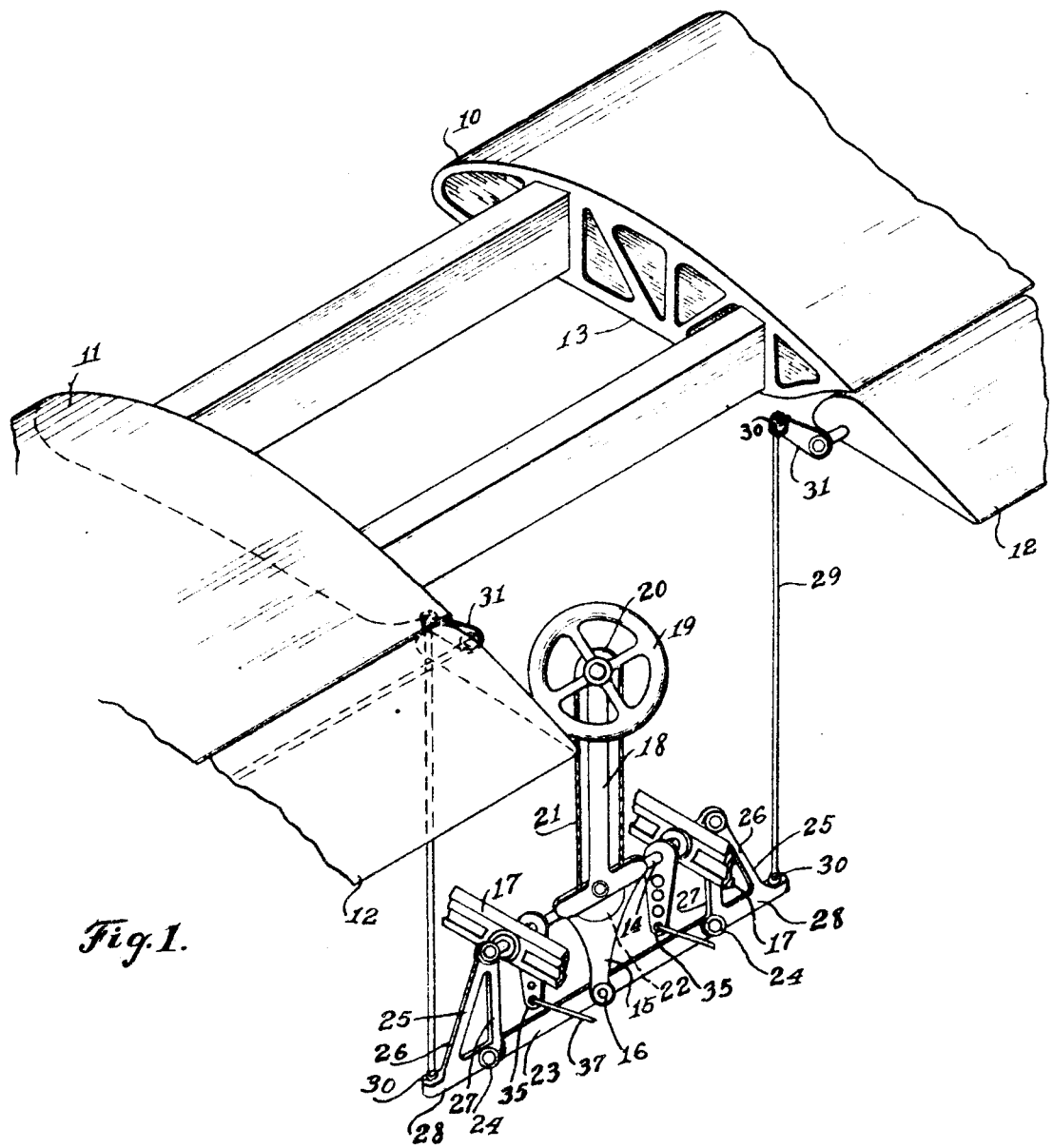
Figure 1 is a fragmentary perspective view of the right and left wing of an aeroplane having ailerons and provided with a steering control according to this invention.

In the drawings right and left aeroplane wings 10 and 11 respectively are each shown provided with an aileron 12 movable to change its profile on the pressure side 13. A shaft 14 is shown mounted for free movements about its axis and pivotally supporting a stick 15 so that the latter element may move in planes longitudinal with its axis. A means is provided for moving the free end 16 of the stick in all directions, and another means provided for transmitting forward and rearward movements of the stick into down movements of said right and left ailerons and up and down movements of the elevator 36, and sideward movement of the stick in one direction into a simultaneous upward movement of the right aileron and downward movement of the left and sideward movement in the other direction into a simultaneous downward movement of the right aileron and upward movement of the left and combination movements of the stick forward or rearwards and sidewards into combination movements of the said ailerons and elevator.

The shaft 14 is shown rotatively mounted between aeroplane body struts 17. Preferably ball bearings should be used for accomplishing the rotative mounting. The stick 15 is mounted above a recessed slot arranged in the center of the shaft 14 so that it extends downwards. The means for moving the free end of the stick in all directions consists of a stem 18 projecting from the shaft 14, a hand wheel 19 on the top of the shaft and connected with a sprocket 20 supporting a chain or control wire 21 engaged over a segment sprocket 22 coaxially fixed upon the pivot point of the stick 15 and so connected as to transmit motions to the latter element.

The means for transmitting movements of the stick 15 as before recited consists of a link 23 pivotally mounted upon the lower end of the stick 15 intermediate of its ends and at its ends 24 pivotally connected upon the altitude ends of the bases of triangular braces 25, or any suitable supporting means for this purpose. These braces are oppositely arranged so that the hypothenusis are on the outside, the altitudes 27 on the inside and the bases 28 at the bottom. The triangular braces 25 are rotatively supported at their top apex coaxially with the shaft 14. Connecting rods 29 are connected by ball joints or universal joints 30 at one of their ends respectively with the outer ends of the bases 28 and by the way of suitable transmission at their tops with cranks 31 arranged upon motion to move the ailerons 12. The parts are so proportioned that when both of the ailerons are in their normal horizontal position, the rods 29 pass through the axis of the shaft 14.

Upon rotation of the wheel 19 in one direction the stick 15 is caused to move in one direction, and upon rotation of the wheel in the other the stick moves in the other. Upon motion of the wheel 19 forwards and rearwards without turning the shaft 14 rotates on its axis and moves the stick 15 rearwards or forwards.

It is evident that the lower end of the stick may be moved in any and all directions.

In Figures 2 to 6, inclusive, various positions of the control device have been shown for a clear understanding of its operation. Considering specifically Figure 2, dot and dash lines 32 indicate the movement of the stick 15 towards the left as though the wheel 19 were rotated through the angle A. The link 23 necessarily will be moved to the left so that the braces 25 move correspondingly. The motion from the right hand brace 25 is transmitted by the connecting rod 29 to the right aileron 12 moving it upwards through an angle of B degrees. Pivoting of the left brace 25 is communicated by the connecting rod 29 to the left aileron 12 and moves it downwards through an angle of C degrees. Angles A, B, and C are of different degrees, B being the smallest, A the intermediate and C the largest. The reason of this can be clearly understood by closely following the movement of the hypothenuse 26 of the braces out of point.

Considering first the right hand brace it will be noticed that the hypothenuse moves clockwise towards the vertical and necessarily the projected movement of the rod 29 will be smaller than the movement of the other rod 29 in which the hypothenuse 26 of the left hand brace moves away from the vertical. This is an elementary fact generally known in the study of geometry. It has been found that with the parts proportioned substantially as shown in Figure 2, if angle A is 15 degrees, angle B will be approximately 11 degrees and angle C will be 16 degrees. Attention is called to the fact that the right connecting rod 29 moves downwards upon the movement of the brace 25 so as to move the right aileron 12 upwards, while the left connecting rod 29 moves upwards in this present construction upon motion of the brace so as to move the left aileron downwards. It is evident that by changing the brace 25 the relative movements of the ailerons with respect to one another may assume positions of different angles, as the size and form of the brace 25 and the member 15 are of deciding influence.

When the wheel 19 is released the ailerons will automatically assume their original normal horizontal position. The air pressure beneath the lower aileron and suction above the latter will force it upwards and pull down the raised aileron until the normal position is reached.

In Figure 3 a schematic showing has been illustrated in which it is assumed that the wheel 19 was moved directly towards the rear (without any rotations) through an angle of D degrees. This motion is transmitted to move the stick 15 rearwards through the same angle so as to move both of the connecting rods 29 simultaneously upwards and move both ailerons 12 simultaneously downwards through E degrees. It does not matter in what sideward position of rotation the stick 15 is in, when it is moved forwards or rearwards from a neutral position it transmits simultaneous movements always downward to the ailerons. If the stick is moved in the true vertical plane the movement and positions of both ailerons are the same, but if the said stick moves to one or the other sides, that is, not in the vertical plane and then is moved forwards or rearwards, the movement will be in the same directions but the amount of motion of each aileron will be slightly different. This is simply a matter of geometry and easily understood upon plotting out the different movements. If the stick 15 were moved towards the front the same angular distance, the ailerons 12 will also move downwards through the same angles as before. Upon release of the stick the air pressure beneath the wings and suction above the latter will automatically return the ailerons to normal positions and the stick 15 to the true vertical.

In Figure 4 a schematic showing has been illustrated in which the parts are assumed in their initial condition identical with the positions shown in Figure 3 and then the wheel 19 rotated through F degrees. Such motion for the reasons before stated causes the right aileron 12 to move upwards from its angle of E degrees to a small angle of G degrees and simultaneously moves the right aileron downwards from its angle of E degrees to an angle of H degrees. From these various examples it must be recognized that complete and very fine control is had of the aileron movements. During flying, especially at landing, braking actions are necessarily obtainable by moving the ailerons through the movements just described, that is, either moving both of the ailerons simultaneously downwards or when necessary in aileron position together. In all cases it is always desirable when the ailerons move in opposite directions that the one moving downwards moves through a large angle while the one moving upwards through a small angle so as to not materially extend above its neutral position adding head on resistance to slow the speed so that the plane turns in a smaller circle.

Radial arms 35 project from the shaft 14 and normally extend vertically downwards. Rods 37 are connected with the radial arms 35 and with cranks 38 connected for moving the elevator 36. The radial arms 35 are provided with a plurality of apertures so that the rods 37 may be connected at various distances from the shaft for amplitude adjustments. In Figure 5 the aileron 12 and the elevator 36 is shown in the normal position. In the event that the stick 15 is moved forwards, the aileron 12 necessarily moves downwards and the motion is also transmitted to the elevator 36 for moving it downwards as shown in full lines in Figure 6. In the event that the stick 15 is moved rearwards, the aileron 12 is moved downwards while the elevator 36 may be moved upward as indicated by numerals 36 and 39.

The parts are so constructed that during forward and rearward motions of the stick 15, and especially during the initial stages of such motion, the elevator is substantially moved while very small motion is transmitted to the ailerons. In this manner the elevator may be used to direct the aeroplane without increasing the head on wing resistance of the plane for reducing its speed. This is particularly desirable in that when the aeroplane is flying at a certain altitude and wishes to climb several hundred feet higher without any decrease in flying speed.

It is pointed out that the rods 37 are substantially tangential to the arcs described by the radial arms 35 during their movements, while the connecting rods 29 substantially pass through the center of the center of curvature of the arcs of the radial arms. Therefore, upon motion of the stick forward and rearward, the rods 37 will be moved through greater distances than the rods 29 and the device is so designed that practically no aileron movement takes place during the first third of the elevator movement. During the last two thirds of the elevator movement substantial movements of the ailerons occur.

Figure 7:
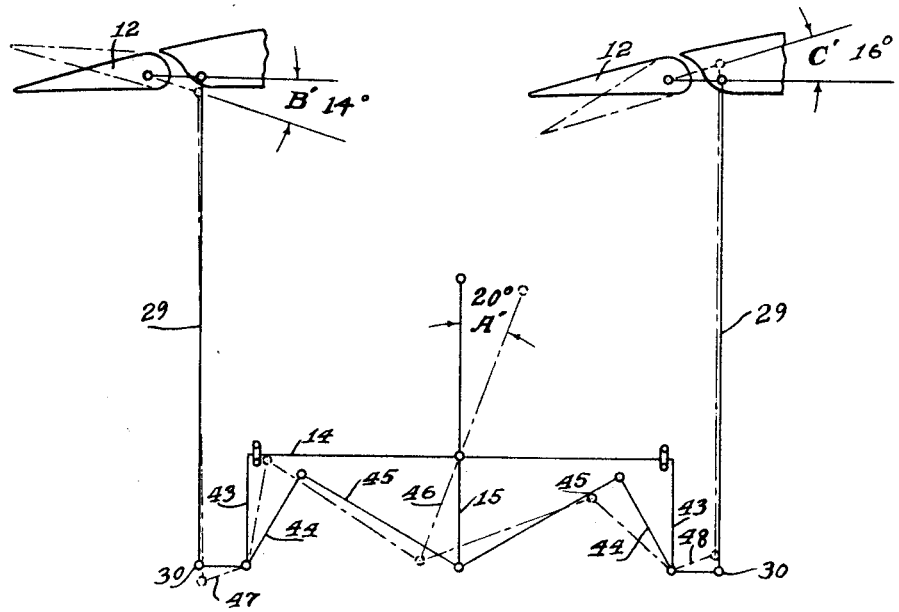
Figure 7 is a schematic view similar to Figure 2, but illustrating another embodiment of the invention.

In the modified form of the device illustrated in Figure 7, a means has been illustrated for transmitting movements of the stick 15 so that during the aileron movements of the ailerons each moves through a slightly different angular distance. This means consists of radial arms 43 coaxially rotatively mounted on the axis of the shaft 14 and supporting at its free ends bell cranks 44. These bell cranks are pivotally mounted intermediate of their ends and are so shaped that their outer ends are outside of the radial arms and their inner ends normally are inside of the radial arms and inclined towards each other. Links 45 pivotally connect the inner ends of the bell cranks 44 with the bottom end of the stick 15. The said connecting rods 29 connect to the outer ends of the bell cranks 44 preferably by universal joints 30. The various parts are so proportioned that when the stick is moved to cause an aileron movement, both of the ailerons move through different angular distances and in their normal positions the rods 29 pass through the axis of the shaft 14. The parts could be so proportioned that the angular distances during the aileron movements are the same.

The dot and dash line 46 indicates a movement of the stick 15 to the left through an angle of A′ degrees. One link 45 transmits this motion so as to move the left hand brace 44 counter-clockwise with the outer end moving downwards as indicated by the dot and dash lines 47. Necessarily the left hand connecting rod 29 is drawing the aileron downwards through an angle of B' degrees. The right hand link 45 moves to move the bell crank 44 to a position as indicated by dot and dash lines 48 so that the outer end moves upwards correspondingly moving the connecting rod 29 and the right hand aileron through an angle of C' degrees.

Figure 8:
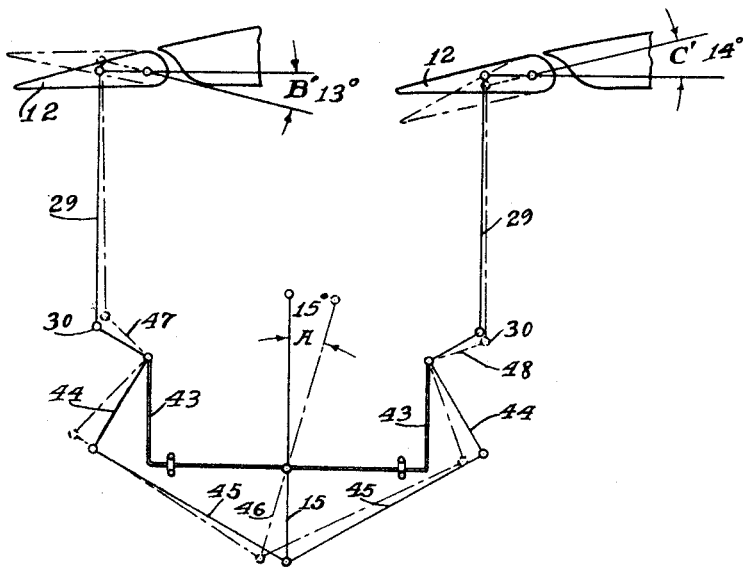
Figure 8 is a schematic view, similar to Figure 7, but illustrating still another embodiment of my invention.

Figure 8 discloses a modification which is very similar to Figure 7, but distinguishes in that the bell cranks 44 are arranged entirely outside of the radial arms 43. The connecting rods 29 connect with one of the ends of the bell cranks and the links 45 with the other ends. The operation of both devices are similar except that in Figure 8 during straight flying or flap movement the connecting rods 29 are under tension while in Figure 7 during the same type of movement the rods 29 are under compression.

The amplitude of action of the various parts in the preferred and modified forms may be adjusted in various manners, for example by changes of the lengths of certain of the parts. If the lengths of the cranks 31 were changed adjustments will be accomplished. Length changes of links 45 also produce adjustments. Likewise numerous other length adjustments also produce amplitude adjustments.

The system of steering may be connected in series or multiple with similar systems so as to be operated by one or more pilots seated behind each other or on the same transverse line.

While I have illustrated and described my invention with some degree of particularity I realize that in practice various alterations therein may be made. I therefore reserve the right and privilege of changing the form of the details of construction or otherwise altering the arrangement of the correlated parts without departing from the spirit or the scope of the appended claims.

Having thus described my invention, what I claim as new, and desire to secure by United States Letters Patent is:

1. In combination with an aeroplane having right and left wings and an elevator each wing provided with an aileron movable to change the wing profile on the pressure side, a shaft mounted for movements about its axis, a stick pivotally supported on said shaft so as to move in planes longitudinal with said axis, means for moving the free end of the stick in all directions, and means for transmitting forward and rearward movements of the stick into up and down movements of said elevator and into downward movements of said right and left ailerons and sideward movement of the stick in one direction into simultaneous upward movement of the right aileron and downward movement of the left and sideward movement in the other direction into simultaneous downward movement of the right aileron and upward movement of the left and combination movements of the stick forward or rearwards and sidewards into combination movements of said ailerons and elevator.

2. In combination with an aeroplane having right and left wings and an elevator each wing provided with an aileron movable to change the wing profile on the pressure side, a shaft mounted for movements about its axis, a stick pivotally supported on said shaft so as to move in planes longitudinal with said axis, means for moving the free end of the stick in all directions, and means for transmitting forward and rearward movements of the stick into up and down movements of said elevator and into downward movements of said right and left ailerons and sideward movement of the stick in one direction into a simultaneous upward movement of the right aileron and downward movement of the left and sideward movement in the other direction into a simultaneous downward movement of the right aileron and upward movement of the left and combination movements of the stick forward or rearwards and sidewards into combination movements of said ailerons and elevator, said shaft being rotatively mounted between aeroplane body struts.

3. In combination with an aeroplane having right and left wings and an elevator each wing provided with an aileron movable to change the wing profile on the pressure side, a shaft mounted for movements about its axis, a stick pivotally supported on said shaft so as to move in planes longitudinal with said axis, means for moving the free end of the stick in all directions, and means for transmitting forward and rearward movements of the stick into up and down movements of said elevator and into downward movements of said right and left ailerons and sideward movement of the stick in one direction into a simultaneous upward movement of the right aileron and downward movement of the left and sideward movement in the other direction into a simultaneous downward movement of the right aileron and upward movement of the left and combination movements of the stick forward or rearwards and sidewards into combination movements of said ailerons and elevator, said means for moving the free end of the stick in all directions consists of a stem projecting diametrically opposite from the stick and on the said shaft, a hand wheel rotatively mounted on the top of the stem, and means for transmitting rotations from the wheel to the stick.

4. In combination with an aeroplane having right and left wings and an elevator each wing provided with an aileron movable to change the wing profile on the pressure side, a shaft mounted for movements about its axis, a stick pivotally supported on said shaft so as to move in planes longitudinal with said axis, means for moving the free end of the stick in all directions, and means for transmitting forward and rearward movements of the stick into up and down movements of said elevator and into downward movements of said right and left ailerons and sideward movement of the stick in one direction into a simultaneous upward movement of the right aileron and downward movement of the left and sideward movement in the other direction into a simultaneous downward movement of the right aileron and upward movement of the left and combination movements of the stick forward or rearwards and sidewards into combination movements of said ailerons and elevator, said means for moving the free end of the stick in all directions consists of a stem projecting diametrically opposite from the stick and on the said shaft, a hand wheel rotatively mounted on the top of the stem, and means for transmitting rotations from the wheel to the stick, said latter means comprising a sprocket wheel coaxially mounted on the wheel and engaged with a control wire or chain extended over a segmental sprocket wheel coaxially mounted on the pivot point of the stick.

5. In combination with an aeroplane having right and left wings and an elevator each wing provided with an aileron movable to change the wing profile on the pressure side, a shaft mounted for movements about its axis, a stick pivotally supported on said shaft so as to move in planes longitudinal with said axis, means for moving the free end of the stick in all directions, and means for transmitting forward and rearward movements of the stick into up and down movements of said elevator and into downward movements of said right and left ailerons and sideward movement of the stick in one direction into a simultaneous upward movement of the right aileron and downward movement of the left and sideward movement in the other direction into a simultaneous downward movement of the right aileron and upward movement of the left and combination movements of the stick forward or rearwards and sidewards into combination movements of said ailerons and elevator, comprising a link pivotally mounted intermediate of its ends upon the lever and of the stick and pivotally connected at its ends to the ends of the bases of a pair of triangular braces having hypothenusis oppositely directed and rotatively mounted at the apexes coaxially with said shaft, and connecting rods from the outer ends of the bases to crank levers mounted upon the ailerons.

6. In combination with an aeroplane having right and left wings each provided with an aileron movable to change its profile on the pressure side, a shaft mounted for movements about its axis, a stick pivotally supported on said shaft so as to move in planes longitudinal with said axis, means for moving the free end of the stick in all directions, a link pivotally mounted intermediate of its ends upon said stick, triangular braces rotatively mounted at their apexes coaxial with said shaft and oppositely arranged with hypothenusis on the outer sides, and the ends of said link being pivotally connected with the bases of said braces at the altitude ends, and a connecting rod between the outer ends of the bases of each brace and cranks arranged for moving the said ailerons.

7. In combination with an aeroplane having right and left wings each provided with an aileron movable to change its profile on the pressure side, a shaft mounted for movements about its axis, a stick pivotally supported on said shaft so as to move in planes longitudinal with said axis, means for moving the free end of the stick in all directions, a link pivotally mounted intermediate of its ends upon said stick, triangular braces rotatively mounted at their apexes coaxial with said shaft and oppositely arranged with hypothenusis on the outer sides, and the ends of said link being pivotally connected with the bases of said braces at the altitude ends, and a connecting rod between the outer ends of the bases of each brace and cranks arranged for moving the ailerons, in normal positions of the braces, that is with the ailerons in their normal positions, the said altitudes being substantially vertical so that movement of the link transmits different movements to the said connecting rods.

8. In combination with an aeroplane having right and left wings and an elevator each wing provided with an aileron movable to change the wing profile on the pressure side, a shaft mounted for movements about its axis, a stick pivotally supported on said shaft so as to move in planes longitudinal with said axis, means for moving the free end of the stick in all directions, and means for transmitting forward and rearward movements of the stick into up and down movements of said elevator and into downward movements of said right and left ailerons and sideward movement of the stick in one direction into a simultaneous upward movement of the right aileron and downward movement of the left and sideward movement in the other direction into a simultaneous downward movement of the right aileron and upward movement of the left and combination movements of the stick forward or rearwards and sidewards into combination movements of said ailerons and elevator, comprising a link pivotally mounted intermediate of its ends upon the lever and of the stick and pivotally connected at its ends to the ends of the basis of a pair of triangular braces having hypothenusis oppositely directed and rotatively mounted at the apexes coaxially with said shaft, and connecting rods from the outer ends of the bases to crank levers mounted upon the ailerons, said connecting rods passing through the axis of said shaft in the normal positions of the support or means mounted in connection with the ailerons.

9. In combination with an aeroplane having right and left wings and an elevator each wing provided with an aileron to change the wing profile on the pressure side, a shaft mounted for movements about its axis, a stick pivotally supported on said shaft so as to move in planes longitudinal with said axis, means for moving the free end of the stick in all directions, and means for transmitting forward and rearward movements of the stick into up and down movements of said elevator and into downward movements said right and left ailerons and sideward movements of the stick in one direction into a simultaneous upward movement of the right aileron and downward movement of the left and sideward movement in the other direction into a simultaneous downward movement of the right aileron and upward movement of the left and combination movements of the stick forward or rearwards and sidewards into combination movements of said ailerons and elevator, comprising a link pivotally mounted intermediate of its ends upon the lever and of the stick and pivotally connected at its ends to the ends of the bases of a pair of triangular braces having hypothenusis oppositely directed and rotatively mounted at the apexes coaxially with said shaft, and connecting rods from the outer ends of the bases to crank levers mounted upon the ailerons, said connecting rods passing through the axis of said shaft in the normal positions of the support or means mounted in connection with the ailerons and radial arms projecting from said shaft and connected with cranks on said elevator.

10. In combination with an aeroplane having right and left wings and an elevator each wing provided with an aileron movable to change the wing profile on the pressure side, a shaft mounted for movements about its axis, a stick pivotally supported on said shaft so as to move in planes longitudinal with said axis, means for moving the free end of the stick in all directions, and means for transmitting forward and rearward movements of the stick into up and down movements of said elevator and into downward movements of said right and left ailerons belated relative to the movements of the elevator in forward and backward motion, and sideward movement of the stick in one direction into a simultaneous upward movement of the right aileron and downward movement of the left and sideward movement in the other direction into a simultaneous downward movement of the right aileron and upward movement of the left and combination movements of the stick forward and rearwards and sidewards into combination movements of said ailerons and elevator.

11. In combination with an aeroplane having right and left wings and an elevator each wing provided with an aileron movable to change the wing profile on the pressure side, a shaft mounted for movements about its axis, a stick pivotally supported on said shaft so as to move in planes longitudinal with said axis, means for moving the free end of the stick in all directions, and means for transmitting forward and rearward movement of the stick into up and down movements of said elevator and into downward movements of said right and left ailerons and sideward movement of the stick in one direction into a simultaneous upward movement of the right aileron and downward movement of the left and sideward movement in the other direction into a simultaneous downward movement of the right aileron and upward movement of the left and combination movements of the stick forward or rearwards and sidewards into combination movements of said ailerons and elevator, comprising radial arms coaxially rotatively mounted on the axis of said shaft, bell cranks pivoted intermediate of their ends upon said radial arms and having outer ends to the outside of the radial arms and inner ends to the inside of the radial arms and inclined towards each other, links connecting the outer ends of the bell cranks with the bottom of said stick and connecting rods from the outer ends of said bell cranks to crank levers mounted on said ailerons.

12. In combination with an aeroplane having right and left wings and an elevator each wing provided with an aileron movable to change the wing profile on the pressure side, a shaft mounted for movements about its axis, a stick pivotally supported on said shaft so as to move in planes longitudinal with said axis, means for moving the free end of the stick in all directions, and means for transmitting forward and rearward movements of the stick into up and down movements of said elevator and into downward movements of said right and left ailerons and sideward movement of the stick in one direction into a simultaneous upward movement of the right aileron and downward movement of the left and sideward movement in the other direction into a simultaneous downward movement of the right aileron and upward movement of the left and combination movements of the stick forward or rearwards and sidewards into combination movements of said ailerons and elevator, comprising radial arms coaxially rotative on the axis of said shaft, bell cranks pivotally mounted on said radial arms, links pivotally connecting one of the ends respectively of the bell cranks with said stick and connecting rods connecting the other ends of the bell cranks with crank levers mounted on said ailerons.

13. In combination with an aeroplane having right and left wings and an elevator each wing provided with an aileron movable to change the wing profile on the pressure side, a shaft mounted for movements about its axis, a stick pivotally supported on said shaft so as to move in planes longitudinal with said axis, means for moving the free end of the stick in all directions, and means for transmitting forward and rearward movements of the stick into up and down movements of said elevator and into downward movements of said right and left ailerons and sideward movement of the stick in one direction into a simultaneous upward movement of the right aileron and downward movement of the left and sideward movement in the other direction into a simultaneous downward movement of the right aileron and upward movement of the left and combination movements of the stick forward or rearwards and sidewards into combination movements of said ailerons and elevator, comprising radial arms coaxially rotative on the axis of said shaft, bell cranks pivotally mounted on said radial arms, links pivotally connecting one of the ends respectively of the bell cranks with said stick and connecting rods connecting the other ends of the bell cranks with crank levers mounted on said ailerons, in normal positions of said bell cranks the links being so connected as to move them through the arcs of circles having slightly different projected distances so that the movements of the ailerons are through slightly different angles.

14. In combination with an aeroplane having right and left wings and an elevator each wing provided with an aileron movable to change the profile of the wing on the pressure side, a shaft mounted for movements about its axis, a stick pivotally supported on said shaft so as to move in planes longitudinal with said axis, means for moving the free end of the stick in all directions, and means for transmitting forward and rearward movement of the stick into up and down movement of said elevator and into downward movements of said right and left ailerons and sideward movement of the stick in one direction into a simultaneous upward movement of the right aileron and downward movement of the left and sideward movement in the other direction into a simultaneous downward movement of the right aileron and upward movement of the left and combination movements of the stick forward or rearwards and sidewards into combination movements of said ailerons and elevator, comprising radial arms coaxially rotatively mounted on the axis of said shaft, bell cranks pivoted intermediate of their ends upon said radial arms and having outer ends to the outside of the radial arms and inner ends to the inside of the radial arms and inclined towards each other, links connecting the outer ends of the bell cranks with the bottom of said stick, and connecting rods from the outer ends of said bell cranks to crank levers mounted on said ailerons, said connecting rods passing through the axis of said shaft in the normal position of said ailerons.

15. In combination with an aeroplane having right and left wings and an elevator each wing provided with an aileron movable to change the wing profile on the pressure side, a shaft mounted for movements about its axis, a stick pivotally supported on said shaft so as to move in planes longitudinal with said axis, means for moving the free end of the stick in all directions, and means for transmitting forward and rearward movements of the stick into up and down movements of said elevator and into downward movements of said right and left ailerons and sideward movement of the stick in one direction into a simultaneous upward movement of the right aileron and downward movement of the left and sideward movement in the other direction into a simultaneous downward movement of the right aileron and upward movement of the left and combination movements of the stick forward or rearwards and sidewards into combination movements of said ailerons and elevator, comprising radial arms coaxially rotatively mounted on the axis of said shaft, bell cranks pivoted intermediate of their ends upon said radial arms and having both ends to the outside of said radial arms, links connecting one of the ends of the bell cranks with the bottom of said stick and connecting rods from the other ends of said bell cranks to crank levers mounted on said ailerons.

16. In combination with an aeroplane having right and left wings and an elevator each wing provided with an aileron movable to change the wing profile on the pressure side, a shaft mounted for movements about its axis, a stick pivotally supported on said shaft so as to move in planes longitudinal with said axis, means for moving the free end of the stick in all directions, and means for transmitting forward and rearward movement of the stick into up and down movements of said elevator and into downward movements of said right and left ailerons and sideward movement of the stick in one direction into a simultaneous upward movement of the right aileron and downward movement of the left and sideward movement in the other direction into a simultaneous downward movement of the right aileron and upward movement of the left and combination movements of the stick forward or rearwards into combination movements of said ailerons and elevator, comprising radial arms coaxially rotatively mounted on the axis of said shaft, bell cranks pivoted intermediate of their ends upon said radial arms and having outer ends to the outside of the radial arms and inner ends to the inside of the radial arms and inclined towards each other, links connecting the outer ends of the bell cranks with the bottom of said stick, and connecting rods from the outer ends of said bell cranks to crank levers mounted on said ailerons, said radial arms being directed away from said ailerons.

17. In combination with an aeroplane having right and left wings and an elevator each wing provided with an aileron movable to change the wing profile on the pressure side, a shaft mounted for movements about its axis, a stick pivotally supported on said shaft so as to move in planes longitudinal with said axis, means for moving the free end of the stick in all directions, and means for transmitting forward and rearward movements of the stick into up and down movements of said elevator and into downward movements of said right and left ailerons and sideward movement of the stick in one direction into a simultaneous upward movement of the right aileron and downward movement of the left and sideward movement in the other direction into a simultaneous downward movement of the right aileron and upward movement of the left and combination movements of the stick forward or rearwards and sidewards into combination movements of said ailerons and elevator, comprising radial arms coaxially rotatively mounted on the axis of said shaft, bell cranks pivoted intermediate of their ends upon said radial arms and having both ends to the outside of said radial arms, links connecting one of the ends of the bell cranks with the bottom of said stick and connecting rods from the other ends of said bell cranks to crank levers mounted on said ailerons, said radial arms being directed towards said ailerons.

Signed a New York city in the county of New York and State of New York this 23rd day of January, A. D. 1930.

ARTHUR G. PETERSEN.